United States Patent [19]
Gruensfelder et al.

[11] Patent Number: 5,975,463
[45] Date of Patent: Nov. 2, 1999

[54] EXPANDABLE AIRCRAFT BAY AND METHOD

[75] Inventors: Cynthia Ann Gruensfelder, St. Louis; Robert Henry Wille, St. Charles, both of Mo.

[73] Assignee: McDonnell Douglas

[21] Appl. No.: 08/576,298

[22] Filed: Dec. 21, 1995

[51] Int. Cl.⁶ ........................................................ B64C 1/30
[52] U.S. Cl. .................... 244/118.1; 244/117 R; 244/118.3; 244/129.4; 244/129.5
[58] Field of Search .............................. 244/129.4, 129.5, 244/130, 118.1, 119, 218, 117 R, 118.3

[56] References Cited

U.S. PATENT DOCUMENTS

| | | |
|---|---|---|
| 2,152,029 | 3/1939 | Cone . |
| 2,749,064 | 6/1956 | Kuhlman, Jr. ............................ 244/130 |
| 2,754,904 | 7/1956 | Provenzano ........................... 244/129.5 |
| 3,037,723 | 6/1962 | Taylor .................... 244/129.5 |
| 3,432,125 | 3/1969 | Schroeder, Jr. .......................... 244/130 |
| 4,838,502 | 6/1989 | Pinson ...................................... 244/130 |
| 5,071,092 | 12/1991 | Williams ............................... 244/129.1 |
| 5,222,699 | 6/1993 | Albach et al. ........................... 244/213 |
| 5,350,136 | 9/1994 | Prosser et al. ....................... 244/129.4 |
| 5,522,566 | 6/1996 | Hardy et al. ............................. 244/130 |
| 5,794,893 | 8/1998 | Diller et al. ............................. 244/130 |
| 5,803,405 | 9/1998 | Ellis et al. .............................. 244/130 |

*Primary Examiner*—William A. Cuchlinski, Jr.
*Assistant Examiner*—Yonel Beaulieu
*Attorney, Agent, or Firm*—Dale B. Halling

[57] ABSTRACT

An aircraft (50) with a variable cargo bay (52) includes a frame (60). A pair of fairing assemblies (54, 56) is coupled to the frame (60). Each of the pair of fairing assemblies (54, 56) has a ramp (100) connected to the frame (60) by a front sliding pivoting mechanism (106). A door assembly (58) is between the pair of fairing assemblies (54, 56) and is coupled to the frame (60).

16 Claims, 14 Drawing Sheets

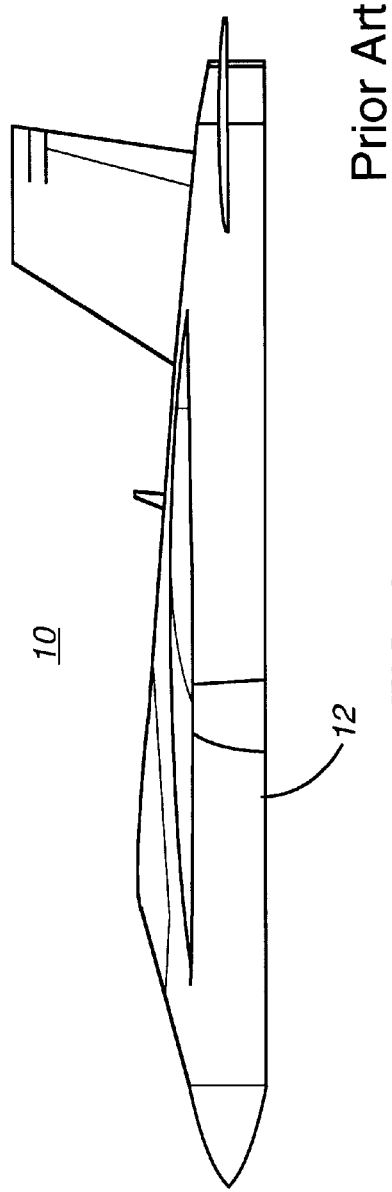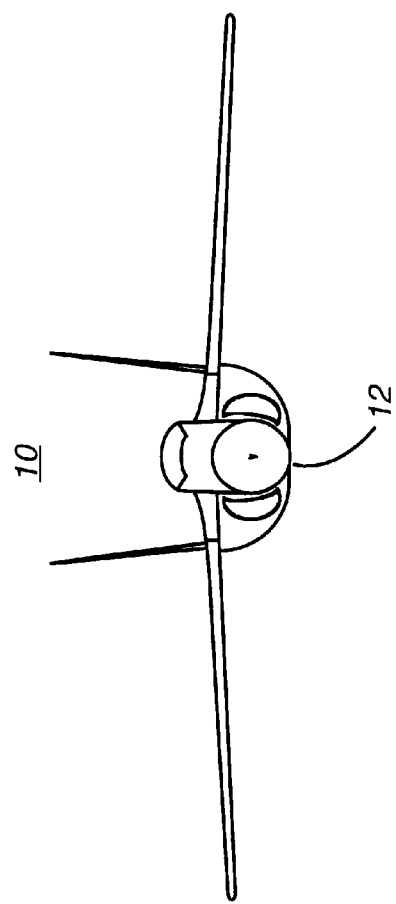

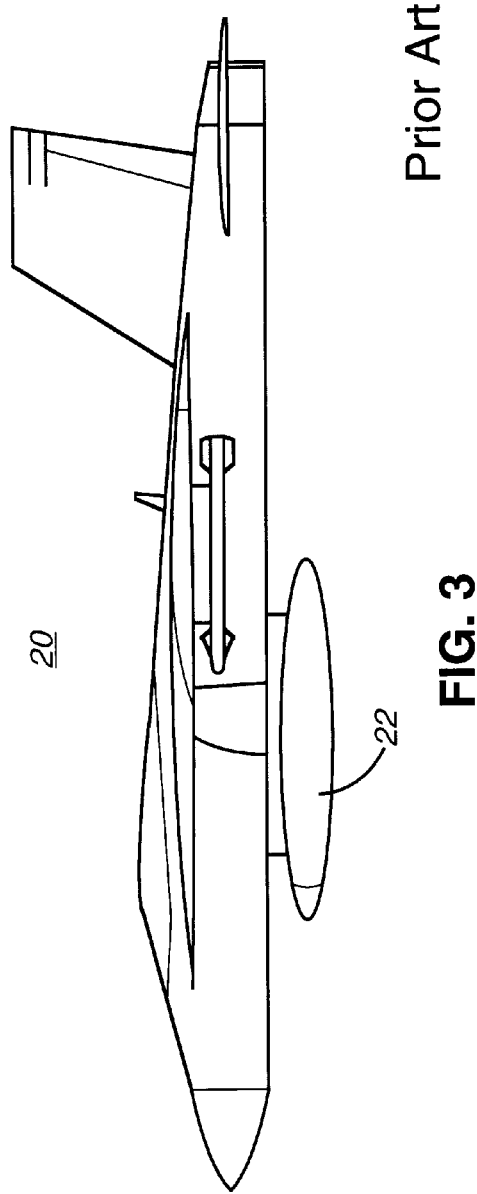
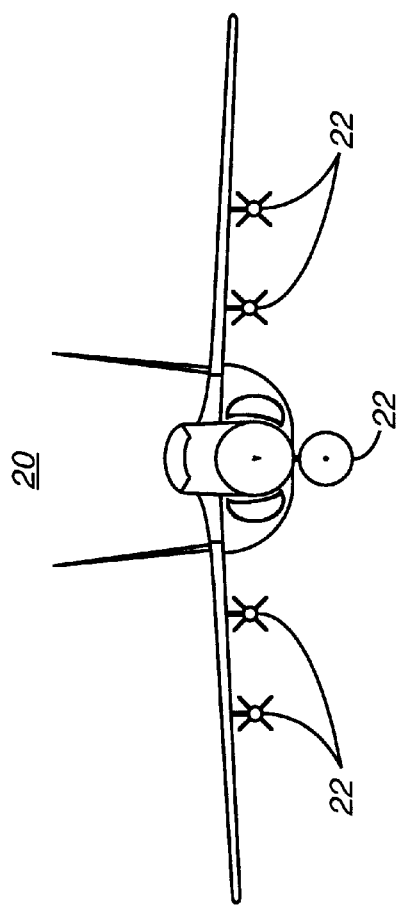
FIG. 3 Prior Art
FIG. 4 Prior Art

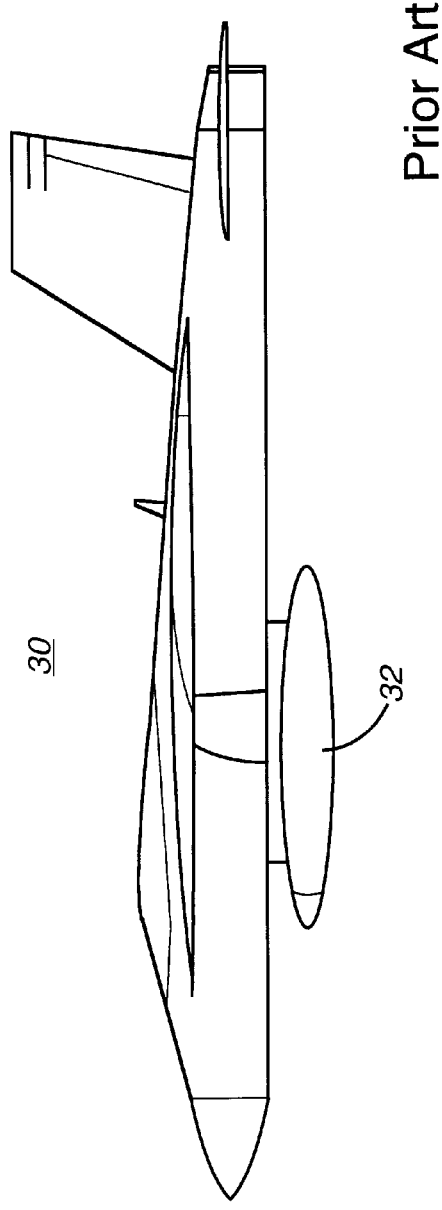
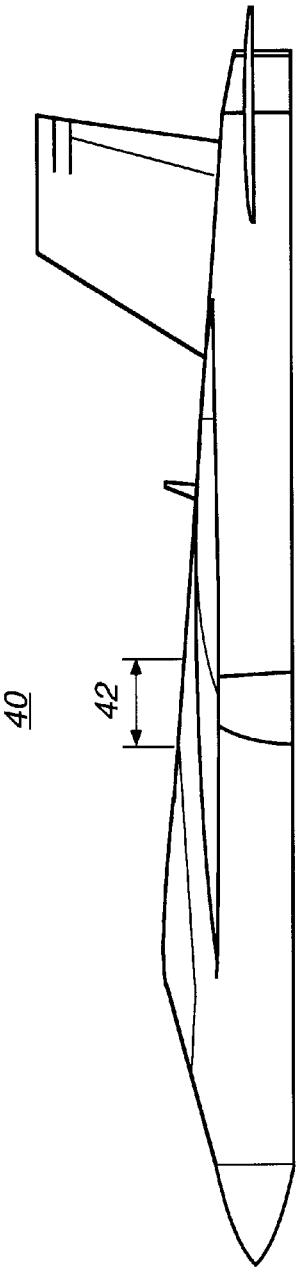
FIG. 5 Prior Art
FIG. 6 Prior Art

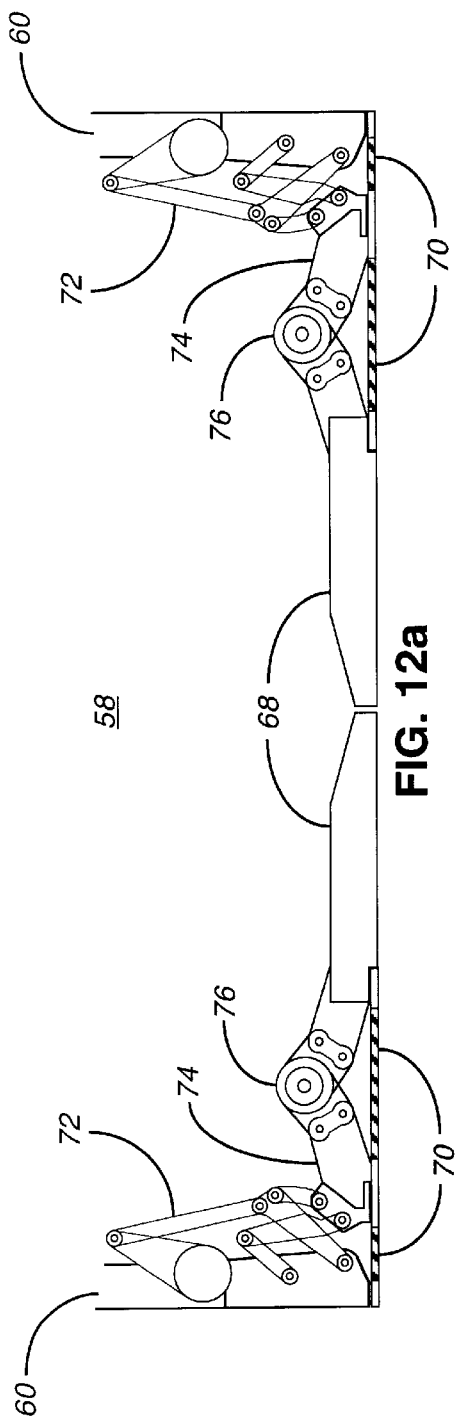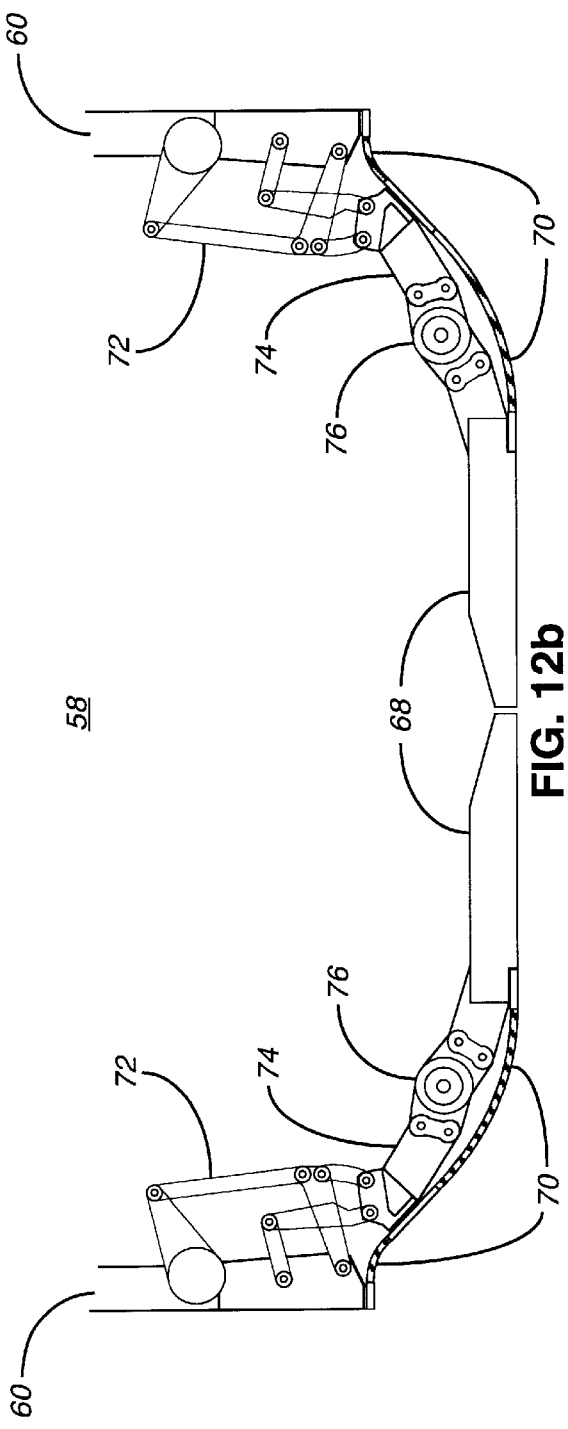

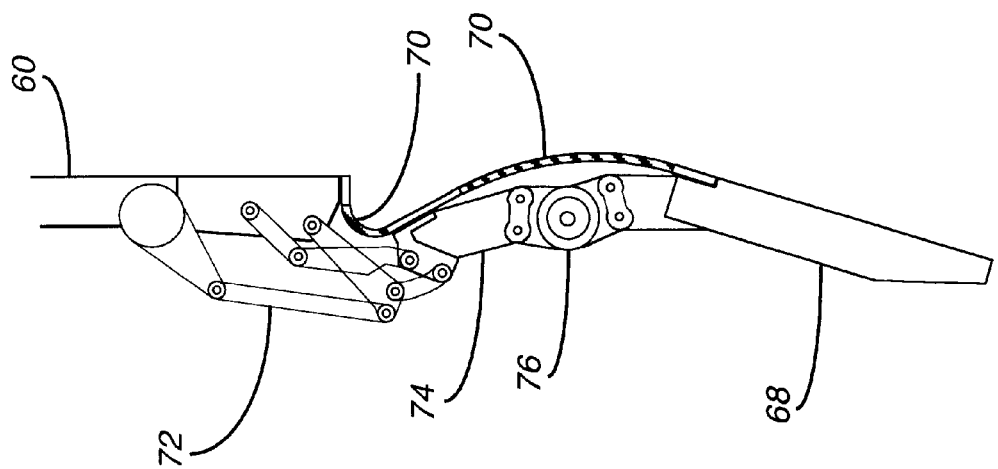
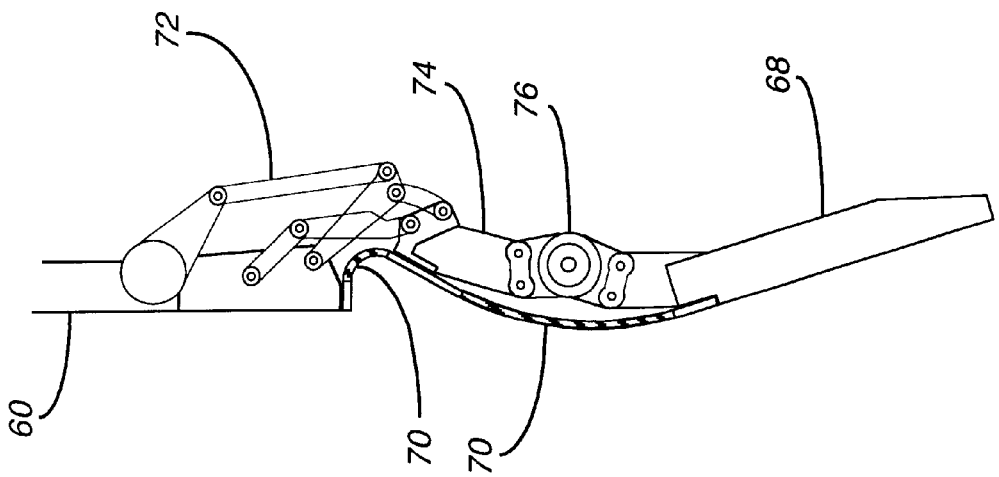
FIG. 13

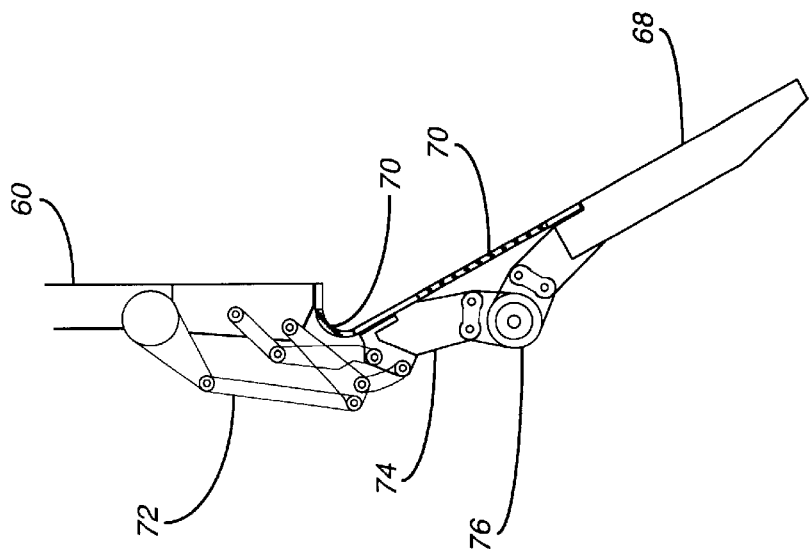
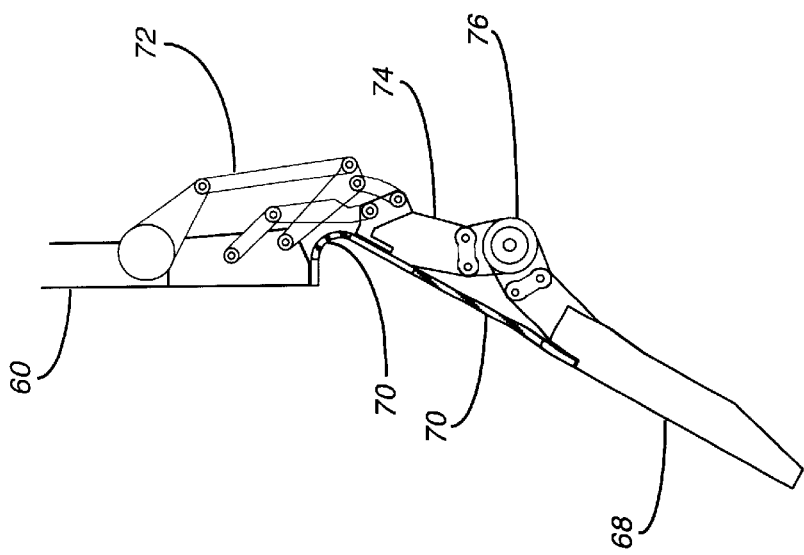
FIG. 14

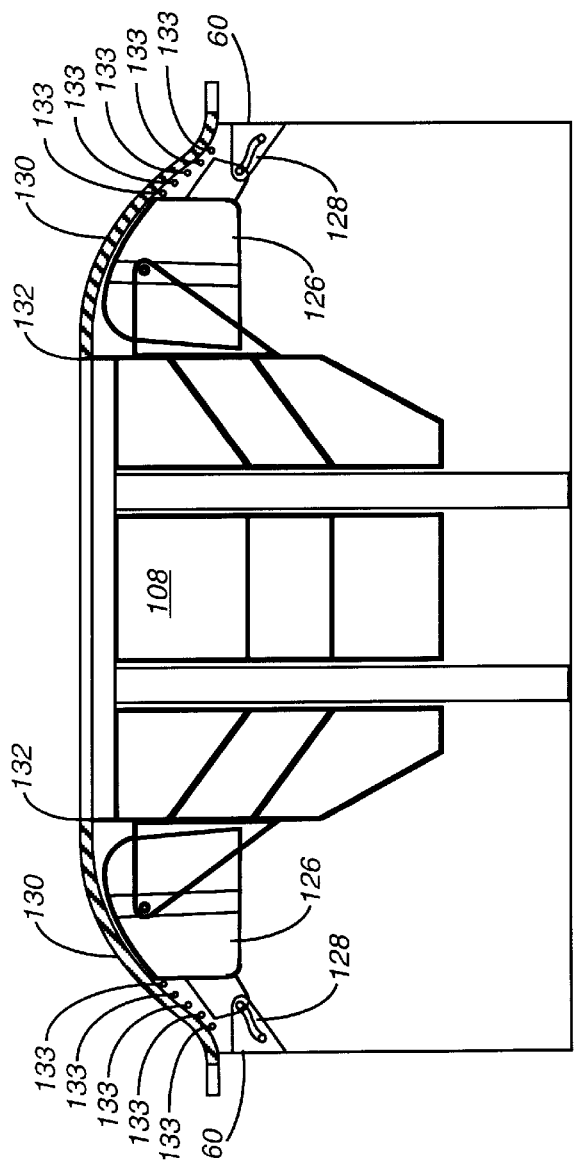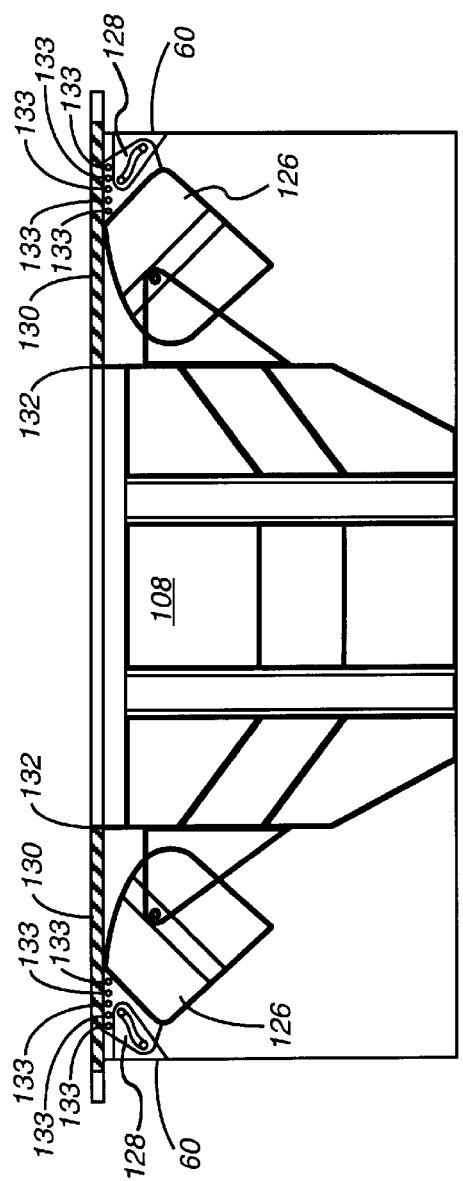

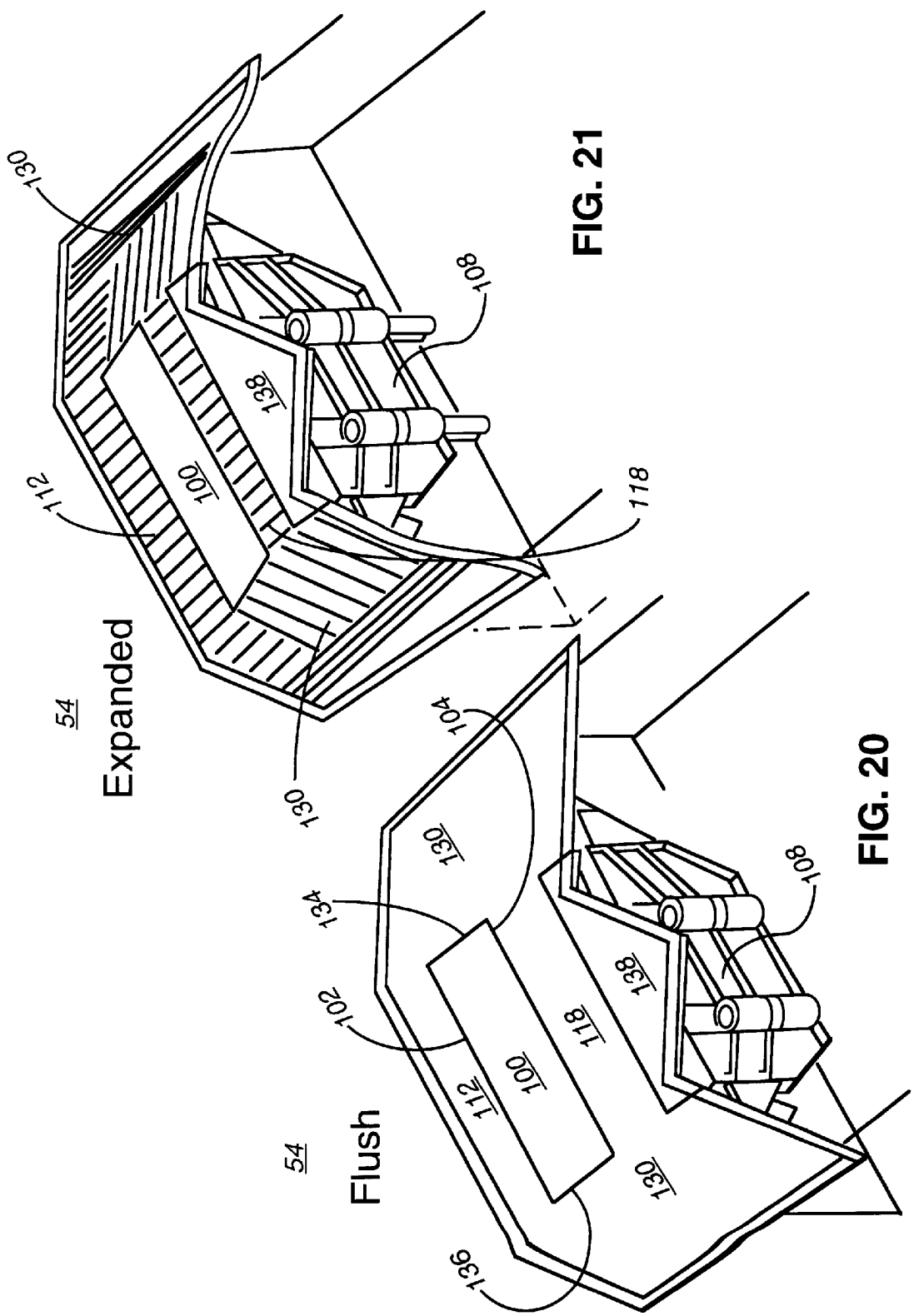

EXPANDABLE AIRCRAFT BAY AND METHOD

FIELD OF THE INVENTION

The present invention relates generally to field of aircraft and more specifically to a method and apparatus for expanding the cargo capacity of an aircraft.

BACKGROUND OF THE INVENTION

Aircraft are generally designed to carry their maximum load in the fuselage and/or wings of the aircraft. A prior art aircraft 10, is shown in FIGS. 1 and 2. The fuselage 12 of the aircraft 10 is where any loads are stored in flight. In modern military aircraft, it is common for the aircraft to have ample thrust to carry larger loads than can fit within its fuselage. One way to take advantage of this extra thrust is to place these oversized loads externally. These external loads are attached to mounts on the wings or fuselage. An example of an aircraft 20 with a plurality of oversized loads 22, is shown in FIGS. 3 and 4. While this allows the aircraft to carry oversized loads, the oversized loads now have to be designed to withstand a severe acoustic environment and carrying the loads externally increases the aerodynamic drag on the aircraft.

Another solution to increasing the payload capacity has been to redesign the aircraft with a larger fuselage so that it can carry larger loads internally. Carrying the loads internally protects the loads from environmental exposure, but increases the size and weight of the aircraft as well as the cost of the aircraft. This is illustrated by FIGS. 5 and 6. FIG. 5 shows an aircraft 30 externally carrying an oversized load 32. FIG. 6 shows a redesigned aircraft 40 capable of carrying the oversized load 32 internally. The redesigned larger aircraft 40 is longer 42 than the aircraft 30 with the external load. In many aircraft, this extra load capacity is only needed for a small percentage of its missions however the size, weight and cost penalties are incurred for all missions.

Thus, there exists a need for an aircraft that can carry oversized loads internally, without incurring the weight, cost and size penalties imposed by designing a larger aircraft.

SUMMARY OF THE INVENTION

An aircraft with a variable cargo bay includes a frame. A pair of fairing assemblies is coupled to the frame. Each of the pairs of fairing assemblies has a ramp connected to the frame by a front sliding pivoting mechanism. A door assembly is between the pair of fairing assemblies and is coupled to the frame.

BRIEF DESCRIPTION OF THE DRAWINGS

FIG. 1 is a side view of a prior art aircraft;

FIG. 2 is a front view of a prior art aircraft;

FIG. 3 is a side view of a prior art aircraft with an external payload;

FIG. 4 is a front view of a prior art aircraft with an external payload;

FIG. 5 is a side view of a prior art aircraft with an external payload;

FIG. 6 is a side view of a prior art aircraft stretched design for expanded cargo capacity;

FIG. 12a is a sectional view of the expandable cargo bay door assembly in a flush position;

FIG. 12b is a sectional view of the expandable cargo bay door assembly in an expanded position;

FIG. 13 is a sectional view of the expandable cargo bay door assembly in a release position;

FIG. 14 is a sectional view of the expandable cargo bay door assembly in a loading position;

FIG. 18 is a sectional horizontal view of the fairing assembly in the expanded position;

FIG. 19 is a sectional horizontal view of the fairing assembly in the flush position;

FIG. 20 is a top left perspective view of the fairing assembly in the flush position;

FIG. 21 is a top left perspective view of the fairing assembly in the expanded position.

DETAILED DESCRIPTION OF THE DRAWINGS

Figure 7:
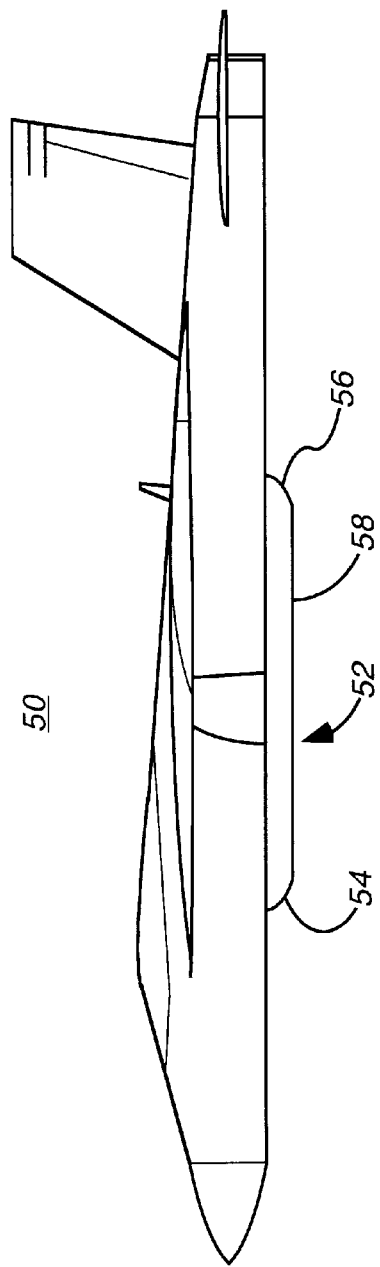
FIG. 7 is a side view of an aircraft with an expandable cargo bay.
Figure 8:
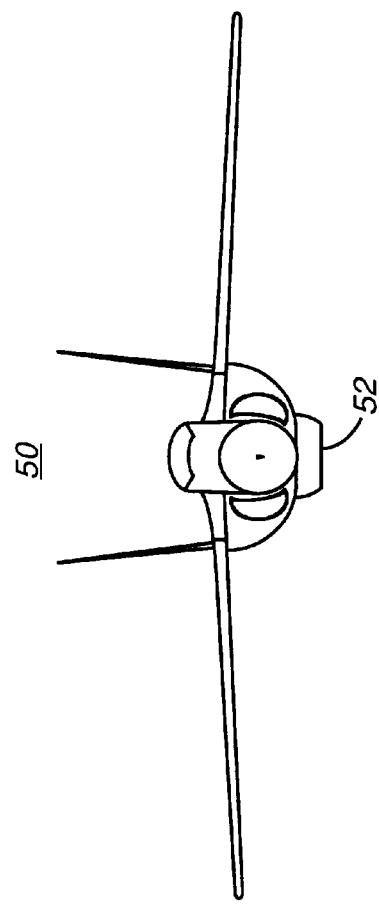
FIG. 8 is a front view of an aircraft with an expandable cargo bay.

Two perspectives of an aircraft 50, with an expandable cargo bay 52 are shown in FIGS. 7 and 8. The expandable cargo bay 52 is shown in an expanded position in FIGS. 7 and 8. In the expanded position, the aircraft 50 can significantly increase it's cargo carrying capacity. When the extra cargo capacity is not required the expandable cargo bay 52 is placed in a flush position. In the flush position the aircraft 50, looks substantially like the aircraft in FIGS. 1 and 2. As a result the aircraft 50 can carry a substantially larger payload internally than the prior art aircraft shown in FIGS. 1–4. In addition, this extra cargo capacity is achieved without the size, weight and cost penalties associated with the prior art aircraft 40 shown in FIG. 6, where the aircraft 40 was lengthened and widened to increase its cargo capacity.

Figure 9:
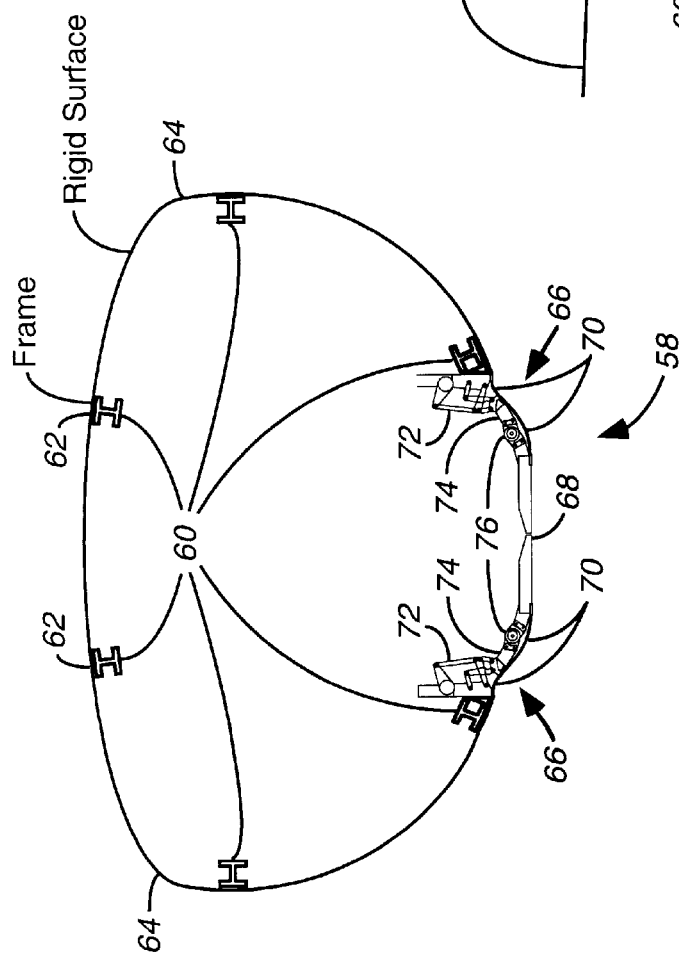
FIG. 9 is a sectional view of an aircraft fuselage with the expandable cargo bay.

The expandable cargo bay 52 is composed of three major assemblies, a front fairing assembly 54, a back fairing assembly 56 and a door assembly 58. The front fairing assembly 54 and the back fairing assembly 56 are similar. A cross section of the door assembly 58 is shown in FIG. 9. The door assembly (translational assembly) 58 is connected to a frame 60 of the aircraft 50. The frame 60 is represented by I beams in the figure. An exterior surface 62 of the frame 60 is substantially covered with a skin (surface) 64.

Figure 10:
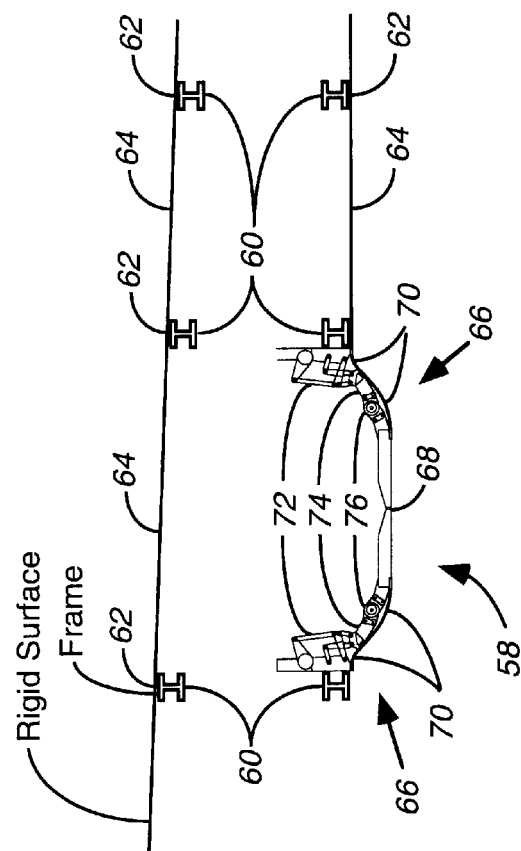
FIG. 10 is a sectional view of an aircraft wing with the expandable cargo bay.

The door assembly 58, shown in FIG. 9, is in the expanded position. The door assembly 58 has a linkage assembly 66, a pair of doors (translational surface) 68 and a continuous moldline technology (CMT) assembly 70. The linkage assembly 66 has a six bar hinge assembly 72 connected to the frame 60 at a first end and connected to a bar 74 at a second end. The bar 74 is connected to a first end of a simple inboard hinge 76 and a second end of the simple inboard hinge 76 is connected to the pair of doors 68. The CMT plate assembly 70 is attached to the skin 64 covering the frame 60 of the aircraft 50 and the bar 74. The CMT plate 70 is attached to the bar 74 and to an exterior surface of the door assembly 68. The CMT plate assembly 70 allows the variable cargo bay 52 to move from the flush to expanded position and still maintain a low aerodynamic drag and cover the bay of the aircraft 50. The CMT plate assembly 70 is capable of being stressed up to 150% beyond its normal shape and still bounces back to its original shape. FIG. 10 shows an alternative design, in which the expandable cargo bay is attached to a wing of the aircraft 50.

Figure 11:
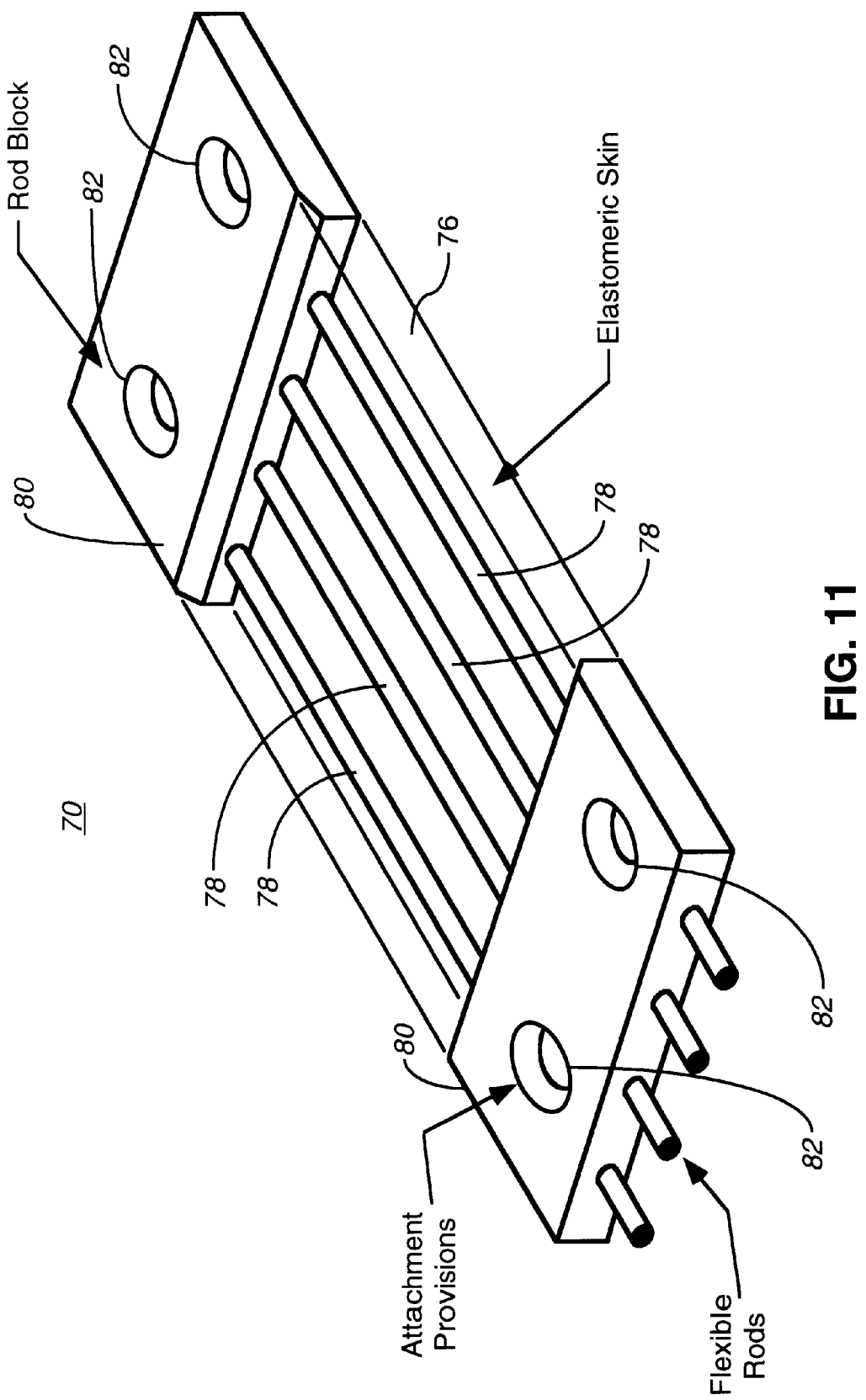
FIG. 11 is a perspective view of a continuous moldline surface (CMT)

FIG. 11 shows a schematic, perspective drawing of the CMT plates 70. An elastomeric skin 76 has a plurality of flexible rods 78 running longitudinally through the elastomeric skin 76. The flexible rods are typically made of quartz epoxy. The flexible rods 78 can slide within the elastomeric skin 76. The elastomeric skin 76 is attached at each end to a pair of rod blocks 80. The flexible rods 78 slide within the rod blocks 80. The rod blocks 80 have a plurality of countersunk screw holes 82 for attachment to the aircraft.

Figure 15:
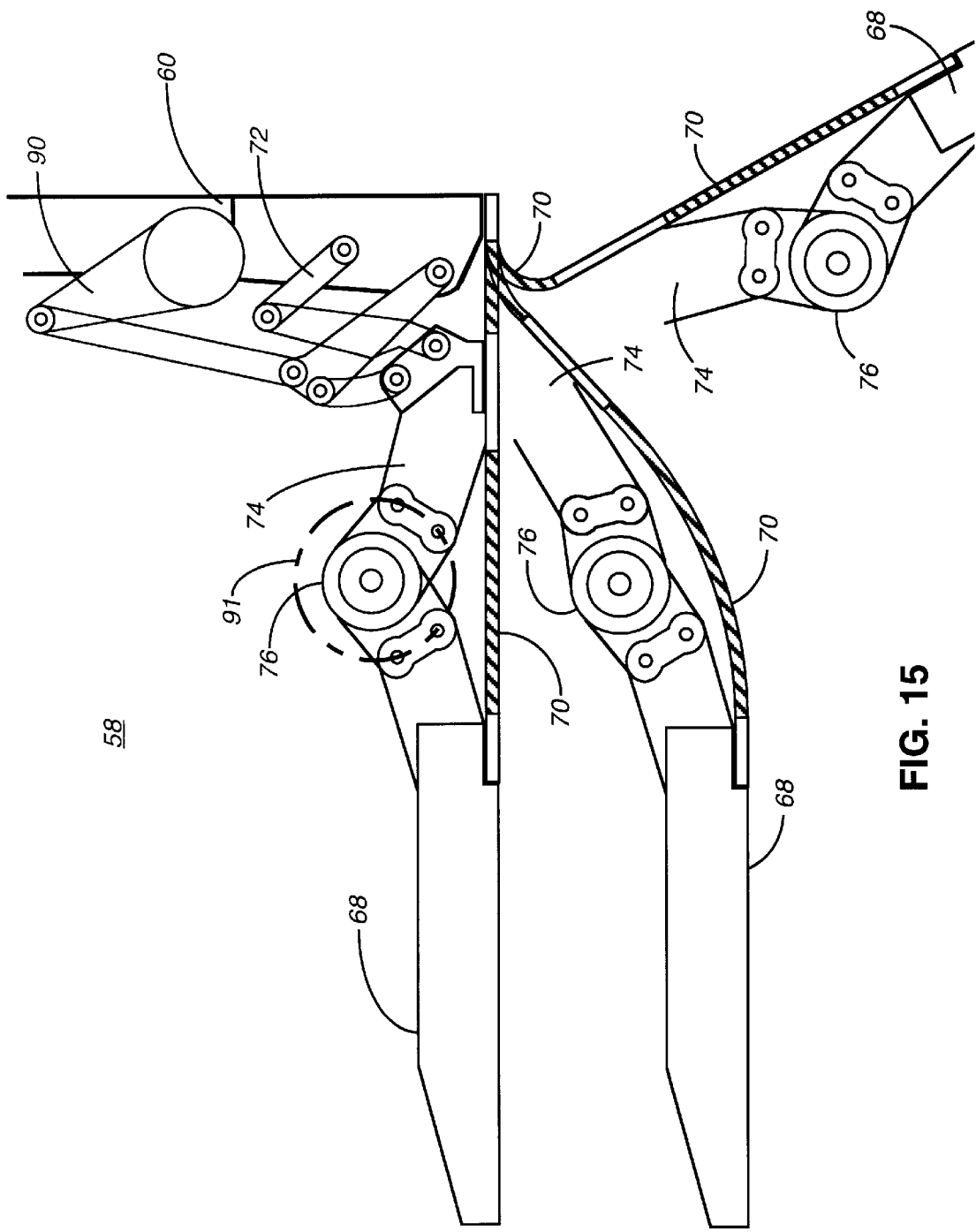
FIG. 15 is a partial sectional view of half the expandable cargo bay door assembly fairing assembly with an actuation mechanism.

FIG. 12a shows a cross section of the door assembly 58 in the flush position. FIG. 12b shows a cross section of the door assembly 58 in the expanded position. FIG. 13 shows the door assembly 58 in a release position. FIG. 14 shows the door assembly 58 in a loading position. FIG. 15 shows a cross section of half the door assembly 58 in several of its positions along with an actuation mechanism 90. Many other actuation schemes will be obvious to those skilled in the art. The actuation mechanism 90 is coupled to the six bar hinge 72 and when the actuation mechanism 90 rotates it moves the six bar hinge 72. A separate actuation mechanism is necessary to cause the door 68 to pivot about the simple inboard hinge 76.

Figure 17:
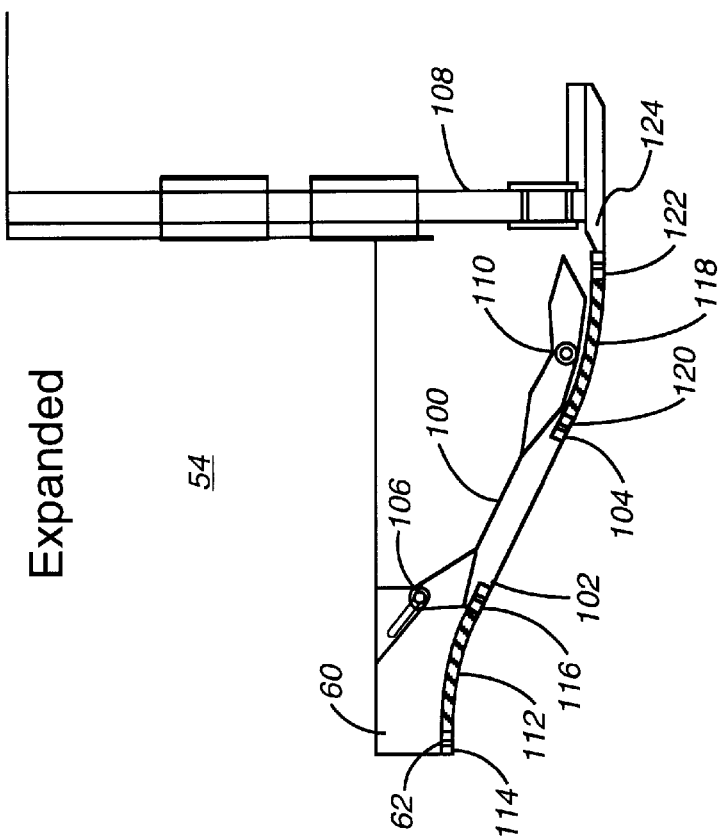
FIG. 17 is a sectional longitudinal view of the fairing assembly in the expanded position.
Figure 16:
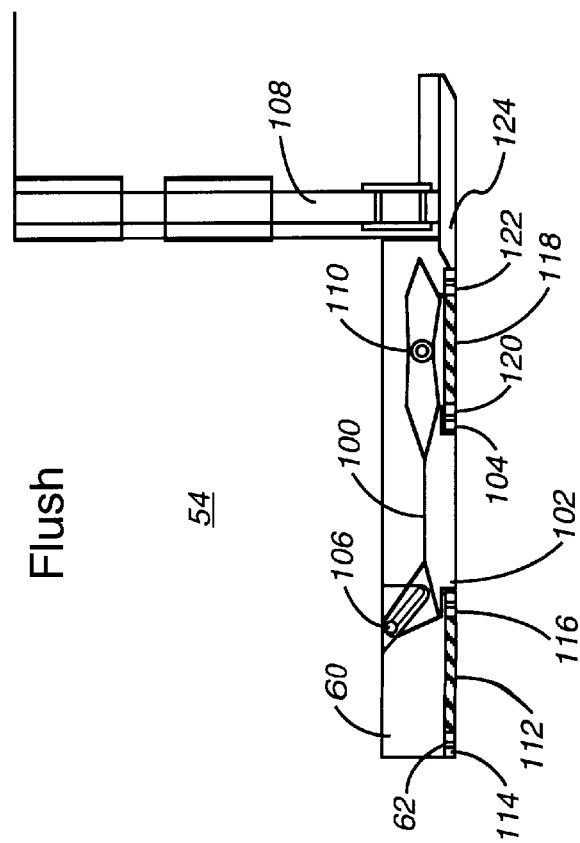
FIG. 16 is a sectional longitudinal view of a fairing assembly in the flush position.

FIG. 16 shows a longitudinal cross section of the fairing assembly 54 in the flush position. Both the front fairing assembly 54 and the back fairing assembly 56 are the similar so only the front fairing assembly will be described. The fairing assembly 54 has a ramp 100 having a first end 102 and a second end 104. The first end 102 is connected to a first (front) sliding pivoting mechanism 106, that connects to the frame 60. The second end 104 is pivotally attached to a translating beam assembly 108 by a simple hinge 110. A CMT plate 112 is connected at a first end 114 to the exterior surface 62 of the frame 60 and is connected at a second end 116 to the ramp 100. A CMT plate 118 is connected at a first end 120 to the second surface 104 of the ramp 100 and at a second end 122 to a long edge 124 of the translating beam assembly 108. FIG. 17 shows a longitudinal cross section of the fairing assembly 54 in the expanded position.

FIG. 18 is a cross section, taken widthwise through the fuselage, and looking at the translating beam assembly 108. The translating beam 108 is pivotally connected to a pair of side followers 126. The side followers 126 are connected to the frame 60 by a pair of second pivoting sliding mechanisms 128. A pair of CMT plates 130 are attached to a pair of short ends 132 of the translating beam assembly 108 and attached to frame 60. A pair of struts 133 are attached to the top of the pair of side followers 126 and below the CMT plates 130. The struts 133 support the CMT plates 130 when the fairing assembly 54 is in the expanded position, as shown in FIG. 18. FIG. 19 shows the fairing assembly in the flush position.

FIG. 20 shows a perspective view, taken from outside the expandable cargo bay, of the front fairing assembly 54 in the flush position. The figure shows that the ramp 100 is connected on the first surface 102, the second surface 104, a third surface 134 and a forth surface 136 to CMT plates 112, 118, 130. FIG. 21 is a perspective view of the front fairing assembly 54, in the expanded position. FIG. 21 shows a V-shaped plate 138 included in the translating beam assembly 108. This V-shaped plate 138 mates with the door assembly 58.

Figure 22:
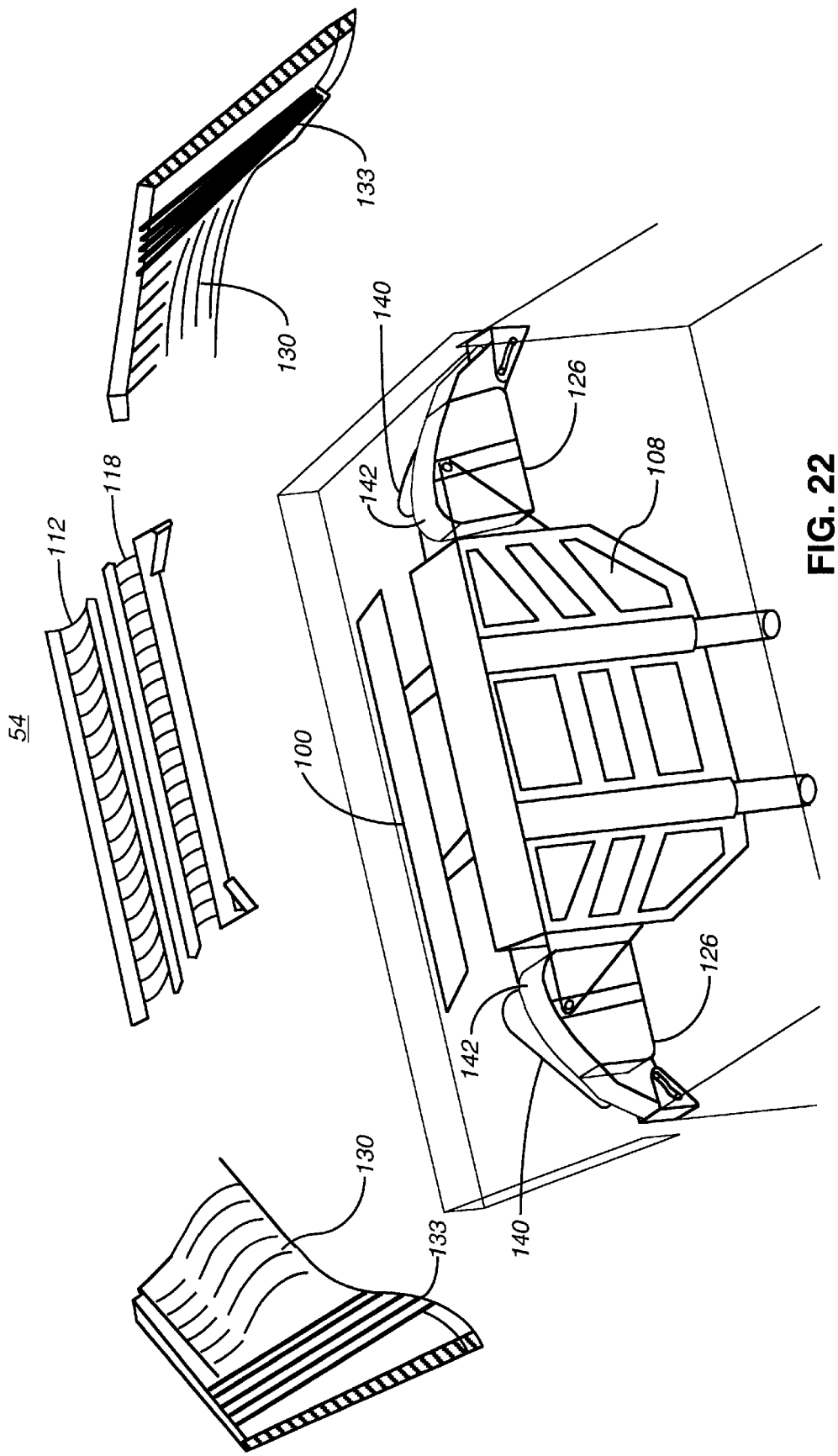
FIG. 22 is an exploded view of the fairing assembly.

FIG. 22 is an exploded view of the front fairing 54. FIG. 22 shows a pair of sills 140 attached to a top surface 142 of the side followers 126. The pair of struts 133 are attached to the pair of sills 140. The struts 133 help support the CMT plates 130.

The expandable cargo bay 52 can be retrofitted onto existing aircraft. The process would involve removing the skin from the existing aircraft, where the expandable cargo bay is to be mounted. Next, the linkage mechanisms are installed. Then the translational surfaces are attached to the linkage mechanisms. Finally, conformable surfaces are attached over the linkage mechanisms to form an aerodynamic surface.

Thus there has been described a novel expandable weapons bay, that allows an aircraft to increase its internal payload when required. By increasing the internal payload the cargo does not have to withstand the environmental exposure to which external payloads are subjected. By carrying the payload internally the drag on the aircraft is reduced compared to externally carried payloads. When the extra cargo capacity is not required, the expandable cargo bay conforms to the standard aircraft mold lines, thus eliminating the additional aerodynamic drag of the expanded position. Finally, the expandable cargo bay is less costly than increasing the depth and size of the existing air frame for the aircraft and out performs the larger design, by weighing less, having better fuel efficiency and performance.

While the invention has been described in conjunction with specific embodiments thereof, it is evident that many alternatives, modifications, and variations will be apparent to those skilled in the art in light of the foregoing description. Accordingly, it is intended the invention embrace all such alternatives, modifications, and variations as fall within the spirit and broad scope of the appended claims.

What is claimed is:

1. An aircraft with a variable cargo bay, comprising:
    a frame;
    a pair of fairing assemblies coupled to the frame, wherein each of the pair of fairing assemblies has a ramp connected to a front sliding pivoting mechanism, that is connected to the frame and a translating beam pivotally connected to the ramp;
    a door assembly, coupled to the frame, between the pair of fairing assemblies; and
    a continuous moldline technology (CMT) plate between a first surface of the ramp and an surface attached to the frame.

2. The aircraft of claim 1, wherein each of the pair of fairings has a continuous moldline technology (CMT) plate between a first surface of the ramp and an surface attached to the frame.

3. The aircraft of claim 1, further including a CMT plate between a second surface of the ramp and the exterior surface and a CMT plate between a third surface of the ramp and the exterior surface.

4. The aircraft of claim 1, further including a CMT plate between a fourth surface of the ramp and a long surface of the translating beam.

5. The aircraft of claim 1, further including a pair of side followers pivotally attached to the translating beam.

6. The aircraft of claim 5, further including a CMT plate attached between the translating beam and the exterior surface.

7. The aircraft of claim 5, further including a pair of side sliding pivoting mechanism connecting the pair of side followers to the frame.

8. The aircraft of claim 7, further including a pair of sills attached to a top of the pair of side followers.

9. The aircraft of claim 8, further including struts attached at a first end to the pair of sills and at a second end to the frame.

10. The aircraft of claim 1, wherein the door assembly has a down lock that is releasable attachable to the fairings assembly.

11. A variable cargo bay connected to a frame having a skin substantially covering an exterior surface of the frame, the variable cargo bay comprising:
- a fairing assembly coupled to the frame, wherein the fairing assembly comprises a ramp connected to the frame by a first sliding pivoting mechanism, and a conformable surface coupling the skin to an edge of the ramp; and
- a translational assembly, adjacent to the fairing assembly and coupled to the frame, comprising a translating beam pivotally connected to the ramp.

12. The variable cargo bay of claim 11, further including a pair of side followers pivotally attached to the ramp.

13. The variable cargo bay of claim 12, further including a pair of second sliding pivoting mechanism connecting the pair of side followers to the frame.

14. The variable cargo bay of claim 12 further including a pair of sills attached to a top surface of the side followers.

15. The variable cargo bay of claim 14, further including a pair of struts attached at a first end to the pair of sills and attached to the frame at a second end.

16. A method for expanding a cargo bay of an aircraft, comprising the steps of:
- (a) attaching a front linkage sliding pivoting mechanism to a frame of the aircraft;
- (b) attaching a ramp of a first fairing to the first linkage sliding pivoting mechanism;
- (c) attaching a translating beam to the frame;
- (d) connecting a pivoting mechanism between the translating beam and the ramp of the first fairing;
- (e) attaching an expandable door assembly to the frame of the aircraft, wherein a front edge of the expandable door assembly is adjacent to a back edge of the first fairing;
- (f) attaching a back linkage mechanism to the frame of the aircraft; and
- (g) attaching a second fairing to the second linkage mechanism, wherein a front edge of the second fairing is adjacent to a back edge of the expandable door assembly.

* * * * *